United States Patent
Amon et al.

(10) Patent No.: US 9,462,284 B2
(45) Date of Patent: Oct. 4, 2016

(54) ENCODING AND DECODING METHOD AND ENCODING AND DECODING DEVICE

(75) Inventors: Peter Amon, München (DE); Jürgen Pandel, Feldkirchen-Westerham (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1737 days.

(21) Appl. No.: 11/791,358

(22) PCT Filed: Nov. 8, 2005

(86) PCT No.: PCT/EP2005/055824
§ 371 (c)(1),
(2), (4) Date: May 23, 2007

(87) PCT Pub. No.: WO2006/056529
PCT Pub. Date: Jun. 1, 2006

(65) Prior Publication Data
US 2008/0069240 A1    Mar. 20, 2008

(30) Foreign Application Priority Data
Nov. 23, 2004  (DE) ........................ 10 2004 056 447

(51) Int. Cl.
*H04N 19/187* (2014.01)
*H04N 19/30* (2014.01)
(Continued)

(52) U.S. Cl.
CPC .......... *H04N 19/187* (2014.11); *H04N 19/103* (2014.11); *H04N 19/15* (2014.11); *H04N 19/30* (2014.11); *H04N 19/61* (2014.11)

(58) Field of Classification Search
CPC .... H04N 19/187; H04N 19/30; H04N 19/15; H04N 19/61; H04N 19/103
USPC ............ 375/240.01, 240.08, 240.12, 240.13, 375/240.18, 240.22, 240.25, 240.26
See application file for complete search history.

(56) References Cited

U.S. PATENT DOCUMENTS

| | | | | |
|---|---|---|---|---|
| 5,706,290 A | * | 1/1998 | Shaw | G06F 9/4887 348/586 |
| 6,226,616 B1 | * | 5/2001 | You | G10L 19/008 704/500 |

(Continued)

FOREIGN PATENT DOCUMENTS

| | | |
|---|---|---|
| CN | 1549988 A | 11/2004 |
| DE | 102 19 640 A1 | 4/2003 |

(Continued)

OTHER PUBLICATIONS

Conci, Nicola, and Francesco De Natale. "Multiple description video coding by coefficients ordering and interpolation." Proceedings of the 2nd international conference on Mobile multimedia communications. ACM, 2006.pp. 1-5.*

(Continued)

*Primary Examiner* — Kari Schmidt
(74) *Attorney, Agent, or Firm* — Slayden Grubert Beard PLLC

(57) ABSTRACT

A method for produces a video data stream for an expansion signal, wherein a base signal represents a first video quality degree and the expansion and base signals jointly represent a second video quality. Only second syntax elements of the expansion signal which are not describable by the first syntax element of the base signal are taken into account during encoding, the coding mode of a video encoding method which is encodable by all syntax elements is selected by means of statistical method, said second syntax elements are not representable by one or several first syntax elements and the method brings about to the production of the shortest video data stream for said second syntax elements. A decoding method for restoring the expansion signal from the video data stream, encoding and coding devices are also disclosed.

16 Claims, 3 Drawing Sheets

(51) Int. Cl.
*H04N 19/15* (2014.01)
*H04N 19/61* (2014.01)
*H04N 19/103* (2014.01)

(56) References Cited

U.S. PATENT DOCUMENTS

| | | | |
|---|---|---|---|
| 7,146,056 B2 | 12/2006 | Gunnewiek et al. | |
| 7,483,581 B2 | 1/2009 | Raveendran et al. | |
| 7,630,439 B2* | 12/2009 | Kato et al. | 375/240.18 |
| 8,023,750 B2 | 9/2011 | Raveendran et al. | |
| 8,098,943 B2 | 1/2012 | Raveendran et al. | |
| 8,270,738 B2 | 9/2012 | Raveendran et al. | |
| 2002/0071485 A1* | 6/2002 | Caglar et al. | 375/240.01 |
| 2003/0021485 A1 | 1/2003 | Raveendran et al. | |
| 2003/0058936 A1* | 3/2003 | Peng | H04N 19/126 375/240.03 |
| 2003/0086622 A1 | 5/2003 | Gunnewiek et al. | |
| 2004/0190618 A1* | 9/2004 | Ota et al. | 375/240.16 |
| 2004/0240559 A1* | 12/2004 | Prakasam et al. | 375/240.25 |
| 2005/0074176 A1* | 4/2005 | Marpe et al. | 382/239 |
| 2005/0094726 A1* | 5/2005 | Park | 375/240.08 |
| 2005/0141621 A1* | 6/2005 | Seo | 375/240.26 |
| 2005/0243917 A1* | 11/2005 | Lee | 375/240.03 |
| 2006/0171463 A1* | 8/2006 | Hanamura et al. | 375/240.13 |
| 2006/0198440 A1* | 9/2006 | Yin et al. | 375/240.12 |
| 2008/0279465 A1 | 11/2008 | Raveendran et al. | |
| 2011/0299594 A1 | 12/2011 | Raveendran et al. | |
| 2011/0299595 A1 | 12/2011 | Raveendran et al. | |

FOREIGN PATENT DOCUMENTS

| | | |
|---|---|---|
| DE | 102 00 901 | 5/2003 |
| DE | 101 46 220.4 | 5/2004 |
| JP | 5-308631 | 11/1993 |
| JP | 2001-45475 | 2/2001 |
| KR | 20040054746 A | 6/2004 |
| KR | 10-2005-0123348 | 12/2005 |
| WO | WO 03/007619 A1 | 1/2003 |
| WO | WO 03/026271 A2 | 3/2003 |
| WO | WO 03/026310 A2 | 3/2003 |
| WO | WO 03/036981 A1 | 5/2003 |

OTHER PUBLICATIONS

Schwarz, Heiko, Detlev Marpe, and Thomas Wiegand. "Overview of the scalable video coding extension of the H. 264/AVC standard." Circuits and Systems for Video Technology, IEEE Transactions on 17.9 (2007): pp. 1103-1120.*

Noll, Peter. "Digital audio coding for visual communications." Proceedings of the IEEE 83.6 (1995): pp. 925-943.*

Duan Dagao, Cou Yansong, Deng Zhongliang:, "A Fast Inter Mode Decision Algorithm for H. 264", Modern Cable Transmission, 2004.3, Seiten 77-79.

Rane S. et al., Systematic lossy forward error protection for error-resilien digital video broadcasting—a wyner-zivcoding approach, Image Processing, 2004, ICIP 04, International Conference, Singapore, Oct. 24-27, 2004, pp. 3101-3104.

Amon P. et al., SNR Scalable Layered Video Coding, International Workshop on Packet Video, Apr. 24, 2002, pp. 1-8.

Amon P. et al., "Efficient coding of synchronized H.26L streams", ITU-Telecommunication Standardization Secotr, No. VCEG-N35, Sep. 20, 2001, pp. 1-7.

Standard ITU-T H.263—Feb. 1998.

Hartung J. et al., "A Real-time Scalable Software Video Codec for Collaborative Applications over Packet Networks", Proc. of the ACM Multimedia 98, MM '98, Bristol, Sep. 12-16, 1998, ACM international Multimedia Conference, New York, NY, ACM, US, vol. Conf. 6, pp. 419-426.

ISO/IEC International Organization for Standardization, "Test Model 5", MPEG Test Model 5, ISO/EC/JTC1/SC29/WG11/N0400, Coded Representation of Picture and Audio Information, Document AVC-491B, Version 2, Apr. 1993, Geneva, ISO, CH, 1993, pp. 1-119.

Ghanbari M., "A Motion Vector Replenishment Video Codec for ATM Networks", Signal Processing, Image Communication, Elsevier Science Publishers, Amstserdam, NL, vol. 3 No. 2/3, Jun. 1991, pp. 143-156.

Lee, B. R. et al., H.263-Based SNR Scalable Video Codec in: IEEE Transactions on Consumer Electronics, vol. 43, No. 3, 1997 pp. 614-622.

English Translation of Korean Office Action received on Jun. 4, 2012 in related Korean Patent Application.

First Chinese Office Action and Search Report dated Nov. 5, 2013 in corresponding Chinese Patent Application No. 201110282846.5 (8 pages) (3 pages of office action summary).

Korean Notice of Allowance dated Oct. 24, 2012 in corresponding Korean Patent Application No. 10-2007-7014314 (3 pages) (3 pages English Translation of allowed Korean application claims).

* cited by examiner

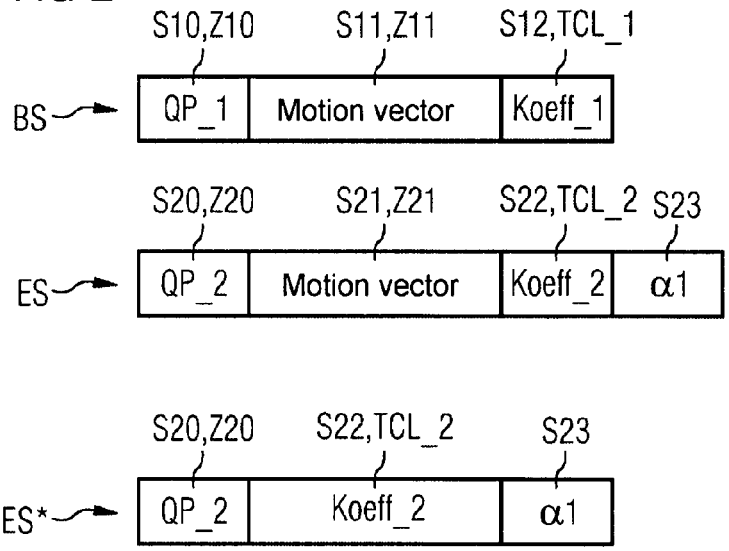
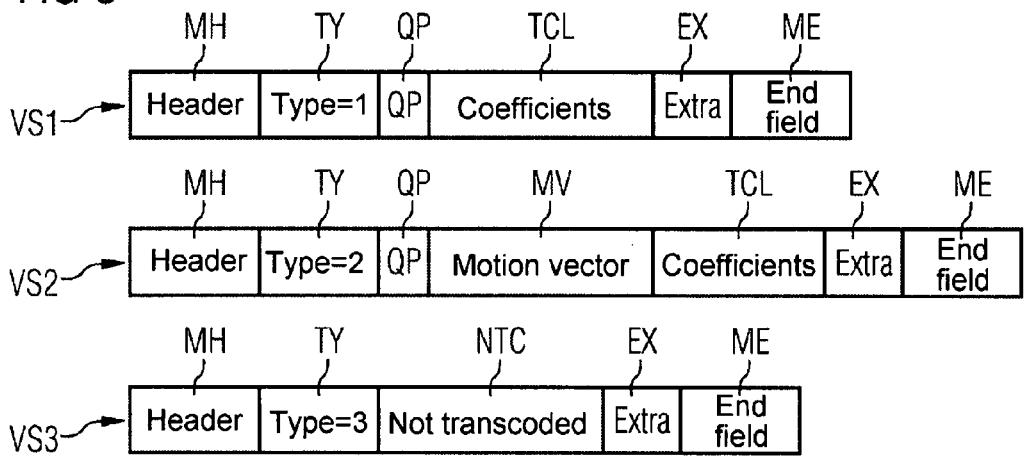
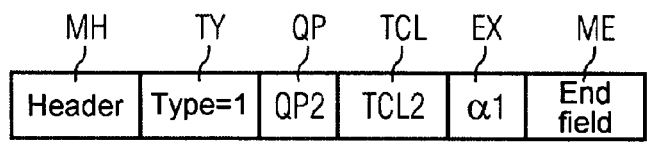

MG(CV,DV)

ENCODING AND DECODING METHOD AND ENCODING AND DECODING DEVICE

CROSS REFERENCE TO RELATED APPLICATIONS

This application is based on and hereby claims priority to PCT Application No. PCT/EP2005/055824 filed on Nov. 8, 2005 and German Application No. 10 2004 056 447.7 filed on Nov. 23, 2004, the contents of which are hereby incorporated by reference.

BACKGROUND

The invention relates to an encoding method for creating a video data stream for an extension signal. Furthermore the invention relates to a decoding method for reconstructing an extension signal from a video data stream and a base signal. Furthermore the invention relates to an encoding device for creating a video data stream and a decoding device for reconstructing an extension signal.

For many applications digital visual signals are to be provided at a plurality of image quality levels. On the one hand these digital, visual signals are to be decoded and displayed on different reproduction devices, such as on a television set and also on a mobile terminal (e.g. mobile telephone) for example. On the other hand the digital visual signals are to be transferred over a plurality of transmission channels to the widest variety of devices. Thus a transmission bandwidth of several megabits per second is available in a cable network, whereas a transmission bandwidth in a mobile radio channel on the other hand possibly amounts to only a few thousand bits per second.

Concepts K. Illgner et al., "Efficient encoding of video signals for scalable multicast storage and transmission as well as associated codec," Publication No. DE 102 00 901 A1; and P. Amon et al., "Prediction of video signal levels for scalable simulcast storage and transmission," file reference of German Patent Application No. DE 101 46 220.4 are already known in which a digital visual signal is made available at a plurality of quality levels. The digital visual signal that represents the lowest quality level is referred to as the base signal. In documents K. Illgner et al., "Efficient encoding of video signals for scalable multicast storage and transmission as well as associated codec," Publication No. DE 102 00 901 A1; and P. Amon et al., "Prediction of video signal levels for scalable simulcast storage and transmission," file reference of German Patent Application No. DE 101 46 220.4 the individual digital visual signals are not encoded independently of each other for this purpose, but a digital visual signal of a higher quality level is derived from one or more digital visual signals of lower quality levels (differential encoding). A differential digital visual signal of a higher quality level is referred to as an extension signal. To guarantee efficient differential encoding, the individual encoders of the various quality levels are synchronized P. Amon et al., "Method for encoding and decoding of video sequences and computer program product,"Publication No. DE 102 19 640 A1. Synchronization in this context means that decisions relating to the encoding of an image are only taken once, e.g. determining a motion vector, and then the encoders of the different quality levels are notified.

SUMMARY

One potential is to provide a method and a device which make it possible for a video data stream to be created for an extension signal or for an extension signal to be reconstructed from a video data stream in a simple and efficient manner.

The inventors propose an encoding method for creating a video data stream for an extension signal, with a first video quality level being represented by a base signal and a second video quality level being represented by the extension signal together with the base signal, the base signal is assigned a plurality of first syntax elements and the extension signal a plurality of second syntax elements for description of the first or second video quality level, a modified extension signal is only allocated those second syntax elements of the extension signal which differ from the first syntax elements, the encoding mode of a video encoding standard is selected using a statistical method which can both encode all second syntax elements of the modified extension signal and which also creates the shortest video data stream, and which creates the video data stream with the second syntax elements of the modified extension signal with the selected encoding mode.

Through the proposed method those second syntax elements which are already present in the first syntax elements of the base signal are no longer taken into consideration in the encoding of the extension signal. This guarantees that only those second syntax elements are encoded which cannot be reconstructed through the base signal. In this case a reduction of the volume of data of the extension signal to be transmitted is achieved. Furthermore the encoding mode for encoding the extension signal is determined which both creates all second syntax elements of the modified extension signal and also creates the shortest video data stream for them. In this case the extension signal is encoded with a small data volume and can be transmitted from a transmitter to a receiver via a narrowband radio channel.

Preferably at least one second syntax element of the extension signal is assigned at least one item of information that specifies whether an image block contains at least one transform coefficient, which image area of an image block includes at least one transform coefficient and/or describes a quantizing parameter of an image block and/or signals a multiplier factor and/or includes at least one transform coefficient. Specifying at least one of these items of information guarantees that a plurality of encoding modes is reduced and thus an encoding mode is able to be selected more quickly by the proposed encoding method.

If the selection takes account of only those encoding modes which exclude an encoding of a second syntax element which describes a motion vector of an image block, the reduction of the encoding modes to be considered enables the determination of the optimum encoding mode to be speeded up.

Preferably a method in accordance with a standard, especially H.261, H.263, H.264, MPEG1, MPEG2 or MPEG4, is used as the video encoding mode. This achieves a cost-effective implementation since existing standard components can be used for the encoding. Furthermore existing standardized encoding systems can be modified with little effort in such a way as to enable the inventive encoding method to be realized.

By the proposed decoding method for reconstructing an extension signal from a video data stream and a base signal, with a first video quality level being represented by a base signal and a second video quality level being represented by the extension signal together with the base signal, a modified extension signal with at least one second syntax element is created by decoding the video data stream using a decoding mode of a video encoding method and the second syntax elements of the extension signal are generated by supplementing the modified extension signal with at least one first syntax element.

The proposed decoding method makes it possible to reconstruct an extension signal from a video data stream, with the video data stream having been created by the proposed encoding method.

Preferably a method in accordance with a standard, especially H.261, H.263, H.264, MPEG1, MPEG2 or MPEG4, is used as the video encoding method. This achieves a cost-effective implementation of the decoding since existing standardized components can be used for the decoding. Furthermore existing standardized decoding systems can be modified with little effort in such a way as to enable the proposed decoding method to be realized.

An encoding device creates a video data stream for an extension signal, with a base signal for representing a first video quality level and the extension signal together with the base signal for representing a second quality level, a first unit for assigning a plurality of second syntax elements to the extension signal and for allocating to a modified extension signal those second syntax elements that differ from first syntax elements of the base signal, a selection unit for selecting that encoding mode of a video encoding method which can both encode all second syntax elements of the modified extension signal and also create the shortest video data stream, and with a second encoding module for creating the video data stream of the modified extension signal with the selected encoding mode. With the proposed encoding device the proposed encoding method can be implemented for example in an imaging device.

A decoding device reconstructs an extension signal from a video data stream and a base signal, with a base signal for representing a first video quality level and the extension signal together with the base signal for representing a second quality level, a second decoding unit for decoding the video data stream into a modified extension signal with a plurality of second syntax elements using a decoding mode of a video encoding method, a generation unit for generating the second syntax elements of the extension signal from the second syntax elements of the modified extension signal and from at least one first syntax element. This makes it possible to execute the proposed decoding method in a reproduction device for example.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
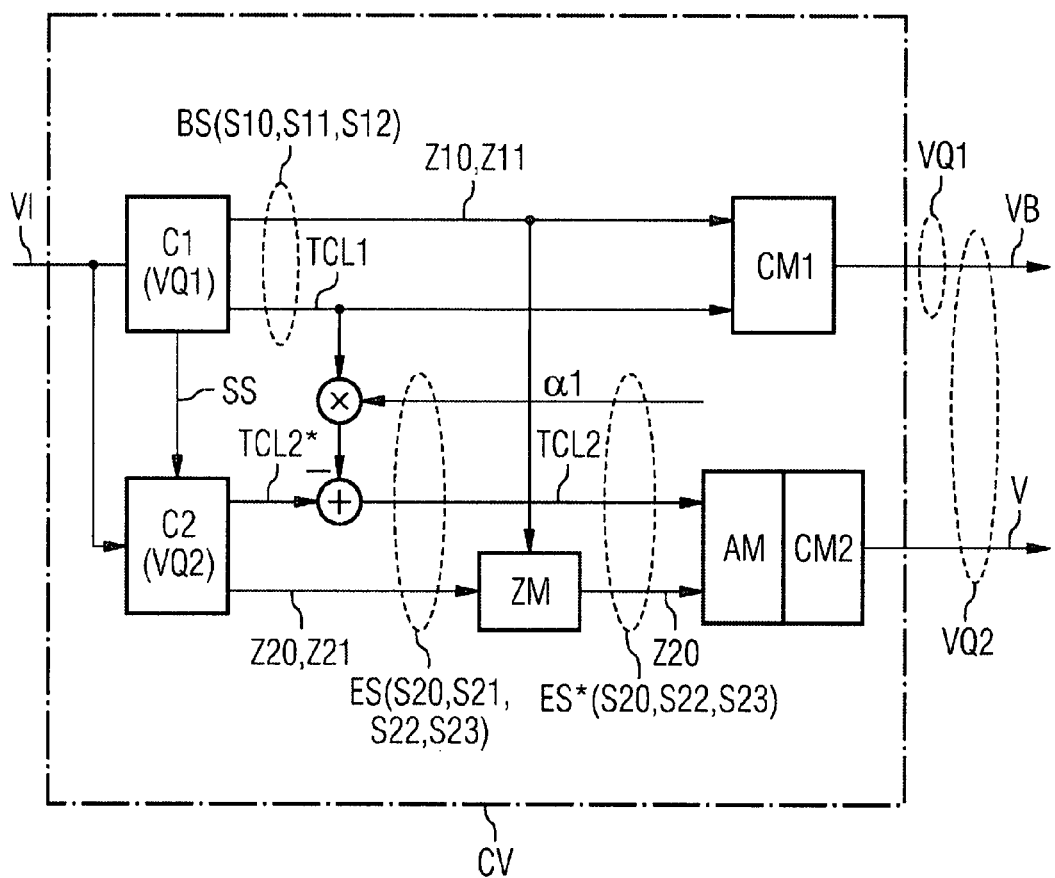
FIG. 1 a typical encoding device for creating a base video data stream with a first quality level and a video data stream with a second quality level, FIG. 2 arrangement of a plurality of syntax elements of a base signal and of an extension signal, FIG. 3 layout of different encoded video streams when one of the respective encoding modes of a video encoding method is applied, FIG. 4 layout of the video data stream taking into account an encoding mode, FIG. 5 the typical layout of a decoding device for reconstructing an extension signal, FIG. 6 a mobile device in the form of a portable mobile radio device with an encoding and decoding device, FIG. 7 a network with a plurality of network elements and one network unit, with this network unit including an encoding and decoding device.

The proposed method is explained in greater detail below with reference to a first exemplary embodiment using [2] the proposed method. FIG. 1 shows a typical encoding device CV for creating a video data stream V for an extension signal ES.

A base video data stream VB is first created with the aid of a first encoder C1 together with a first encoding module CM1. This base video data stream VB represents an encoded video signal of a first video quality level VQ1. The base video data stream VB is formed from the base signal BS, with the base signal BS also being representative of the first video quality level VQ1.

A second encoder C2, a first unit ZM, a selection unit AM and a second encoding module CM2 create the video data stream V. This video data stream V presents an encoded video signal which, together with the base video data stream VB, represents a second quality level VQ2. The video data stream V is formed from the extension signal ES and thus the extension signal ES together with the base signal BS also represents the second video quality level VQ2.

The encoding device CV is fed a sequence of digitized input images VI. Initially a first part encoding is performed by the first encoder C1. The first encoder C1 for example thus determines with the aid of a motion estimation process a motion vector for a current image block to be encoded, forms a difference signal using coefficients from a coefficient of the current image block and a coefficient of that image block described by the motion vector determined, executes a transformation of this difference signal, for example a discrete Cosine transformation, and subsequently quantizes the transformed phase difference signal.

Each transformed and quantized difference signal is referred to below as a transform coefficient. The transform coefficients of a current image block which are created by the first encoder C1 are referred to as first transform coefficients TCL1. In addition to the first transform coefficients TCL1 the first encoder C1 supplies first encoding parameters Z10, Z11, such as the first quantizing parameter Z10=QP1 for example and one or more motion vectors Z11. Thus the base signal BS includes a plurality of first syntax elements S10, S11, S12, such as the first quantizing parameter QP1=S10=Z10, one or more motion vectors Z11=S11 and the first transform coefficients TCL1=S12 for example.

In a next processing step the first syntax elements S10, S11, S12 are supplied to the first encoding module CM1. The task of the first encoding module CM1 is to encode the base signal BS into a base video data stream VB. In this case for example each first syntax element S10, S11, S12 is allocated a predefined position in the base video data stream VB to be created, and using compression techniques, such as a Huffman encoding for example, a reduction in data is achieved. The first encoder C1 and the first encoding module CM1 can also operate according to a video encoding method, especially according to a video encoding standard H.261, H.263, H.264, MPEG1, MPEG2 or MPEG4. The first encoder C1 and encoding module CM1 can be accommodated in a single unit.

In parallel to the creation of the base video data stream VB, the video data stream V for the extension signal ES is created by the second encoder C2, the first unit ZM, the selection unit AM and the second encoding module CM2. This is done by initially feeding the video input signal VI to the second encoder C2. By contrast with the method of operation of the first encoder C1, the second encoder is sent encoding specifications (=synchronization) by a control signal SS. In this case for example a motion vector is notified which the second encoder C2 must take into account in creating the second provisional transform coefficient TCL2*. After a motion vector to be taken into account has been transmitted to the second encoder C2 by the control signal SS for example, the second encoder C2 uses coefficients to form a difference signal from a coefficient of an image currently to be encoded and a coefficient which lies in the image area predetermined by the motion vector, executes a transformation of this difference signal, for example with the aid of a discrete Cosine transformation, and subsequently quantizes the transformed difference signal with the aid of a second quantizing parameter QP2. These transformed and quantized difference signals are referred to as second provisional transform coefficients TCL2*. In addition the second encoder C2 creates a plurality of second encoding parameters Z20, Z21, with for example QP2=Z20 being the second quantizing value and Z21 being the motion vector. Alternatively one or more motion vectors can also be predetermined by the control signal SS.

In accordance with P. Amon et al., "Prediction of video signal levels for scalable simulcast storage and transmission," file reference of German Patent Application No. DE 101 46 220.4 second transform coefficients TCL2 are formed using a multiplier factor $\alpha 1$, taking into account the second provisional transform coefficient TCL2* and the first transform coefficient TCL1. The following equation describes the precise relationship:

$$TCL2 = TCL2^* - \alpha 1 * TCL1 \tag{1}$$

This equation (1) is applied using coefficients.

Thus the extension signal ES includes a plurality of second syntax elements S20, S21, S22, S23, whereby the second quantizing value QP2=S20, the motion vector=S21, the second transform coefficient TCL2=S22 and the multiplier factor $\alpha 1$=S23. In an alternative embodiment the multiplier factor $\alpha 1$ can be computed from the first and second quantizing value QP1, QP2, such as $\alpha 1$=QP2/QP1 for example, and thus need not be transmitted.

With the aid of FIG. 2 the method of operation of the first unit ZM is explained in greater detail below. FIG. 2 shows the individual syntax elements, first or second syntax elements for the base signal BS or for the extension signal ES. It is evident from this figure that for example the first transform coefficient TCL1 differs from the second transform coefficient TCL2, however the motion vector S11=S21 is identical in the base signal BS and also in the extension signal ES*. In a subsequent processing step the first unit ZM analyzes which second syntax elements S20, . . . , S23 are already present in the base signal BS, i.e. are identical to one or more first syntax elements S10, . . . , S12. All second syntax elements S21 which are already present in the base signal BS are removed from the extension signal ES. The result of this working step of the first unit ZM is to be seen in FIG. 2 in the modified extension signal ES*. This includes only the second syntax elements S20, S22, S23, since the motion vector S21=S11 is already present in the base signal BS. This means that after this processing step by the first unit ZM a modified extension signal ES* is available which only still includes those second syntax elements S20, S22, S23 which are not present in the base signal BS.

In a next processing step, with the aid of the selection unit AM, that encoding mode of a video encoding method is selected for creating the video data stream V with the aid of statistical methods which can both encode all second syntax elements S20, S22, S23 of the modified extension signal ES* and also creates the shortest video data stream V. This is explained in greater detail with the aid of FIG. 3.

FIG. 3 shows the layout of different encoded video streams VS1, VS2, VS3, with the first encoded video stream VS1 being encoded with the aid of a first encoding mode and the second encoded video stream VS2 being encoded with the aid of a second encoding mode and the third encoded video stream by a third encoding mode. The first encoded video stream VS1 in this case includes the following data fields for example:

Main header MH:
    Specifies encoding parameters, such as for example height and width of an image to be encoded, and specifies an image number within the sequence of images.
Type TY:
    In this case a distinction can be made as to the encoding mode with which encoded video stream was created.
    If the encoded video stream was encoded with the aid of an intercoding mode, motion vectors can follow for example. In the present exemplary embodiment the type TY=1 indicates that an intracoded video stream is involved here, since no motion vector follows.
Quantizing parameter QP:
    The quantizing parameter QP specifies a value for the quantizing of the transformed difference signals.
Coefficients TCL:
    This field includes the quantized and transformed coefficients of an image block.
Extra EX:
    Additional parameters are specified here which can be evaluated on a proprietary basis, such as copyright information or author information for example.
End field ME:
    This data field indicates an end of the encoded video stream.

The second encoded video stream VS2 includes almost the same fields as the first encoded video stream VS1, however another type TY=2 is used to indicate that a motion vector MV is additionally present.

The third encoded video stream VS3 of type TY=3 does not include any motion vector field MV and no transform coefficients TCL. Only a non-encoded field NTC is additionally present, which for example indicates that the stream contains no transform coefficients TCL.

These three encoded video streams VS1, . . . , VS3 merely represent one possible exemplary embodiment. An actual video encoding method, such as according to the video encoding standard H.264 for example, can feature both more data fields and different data fields from this example as well as a plurality of different encoding modes.

In the present exemplary embodiment the selection unit AM analyzes the modified extension signal ES* and detects that at least the second quantizing value QP2, the second transform coefficient TCL2 and the multiplier vector $\alpha 1$ must be encoded with the aid of one of the three possible encoding modes, which create either the first, second or third encoded video stream VS1, . . . , VS3. The selection unit AM detects that the third encoded video stream VS3, generated by the third encoding mode, cannot encode all syntax elements S20, S22, S23 of the modified extension signal ES* to be encoded. Therefore only the first and second encoding mode will be further considered. The selection unit AM now calculates the number of bits which will be needed to encode a first encoded video stream VS1 or a second encoded video stream VS2, taking into account the second syntax elements S20, . . . , S23 of the modified extension signal ES*. The selection unit AM determines for example that the first encoding mode needs 1530 bits and the second encoding mode 2860 bits for encoding. Because of this result the selection unit AM decides on that encoding mode which creates the shortest video data stream V for encoding of the modified extension signal ES*. I.e. in this exemplary embodiment the selection unit AM selects the first encoding mode.

In a concluding processing step the second encoding unit CM2 creates the video data stream V of the modified extension signal ES*. An example of this is depicted in FIG. 4. In this case the video data stream V includes the main header MH, the type TY=1, the quantizing parameter QP=QP2, the second transform coefficient TCL=TCL2, in the extra field EX the multiplier factor $\alpha 1$ and finally the end field ME.

The second encoder C2, the first unit ZM, the selection unit AM and the second encoding module CM2 can be combined in one or more modules. Furthermore the second encoder C2 and the second encoding module CM2 can create the video data stream V in accordance with a video encoding method, especially according to a video encoding standard H.261, H.263, H.264, MPEG1, MPEG2 or MPEG4.

As shown in the exemplary embodiment in accordance with FIG. 1, a motion vector to be used for the encoding by the second encoder C2 is communicated by the control signal SS for example. Thus for example the transmission of the motion vector with the aid of the video data stream V is not necessary, since the identical motion vector is transmitted by the base video data stream VB. This means that it can be useful in an alternate embodiment merely to take into account those encoding modes in the selection by the selection unit AM which do not encode any motion vector. If for example three different encoding modes are present, of which the first two encoding modes execute different intra encodings, which means an encoding without motion vector, this alternative guarantees that only one of these two intra encoding modes will be taken into account.

As well as the alternative in the selection of an encoding mode of taking into account one or more parameters of an entire image, it can be useful to undertake the selection of the encoding mode separately for each image block of an image.

Figure 5:
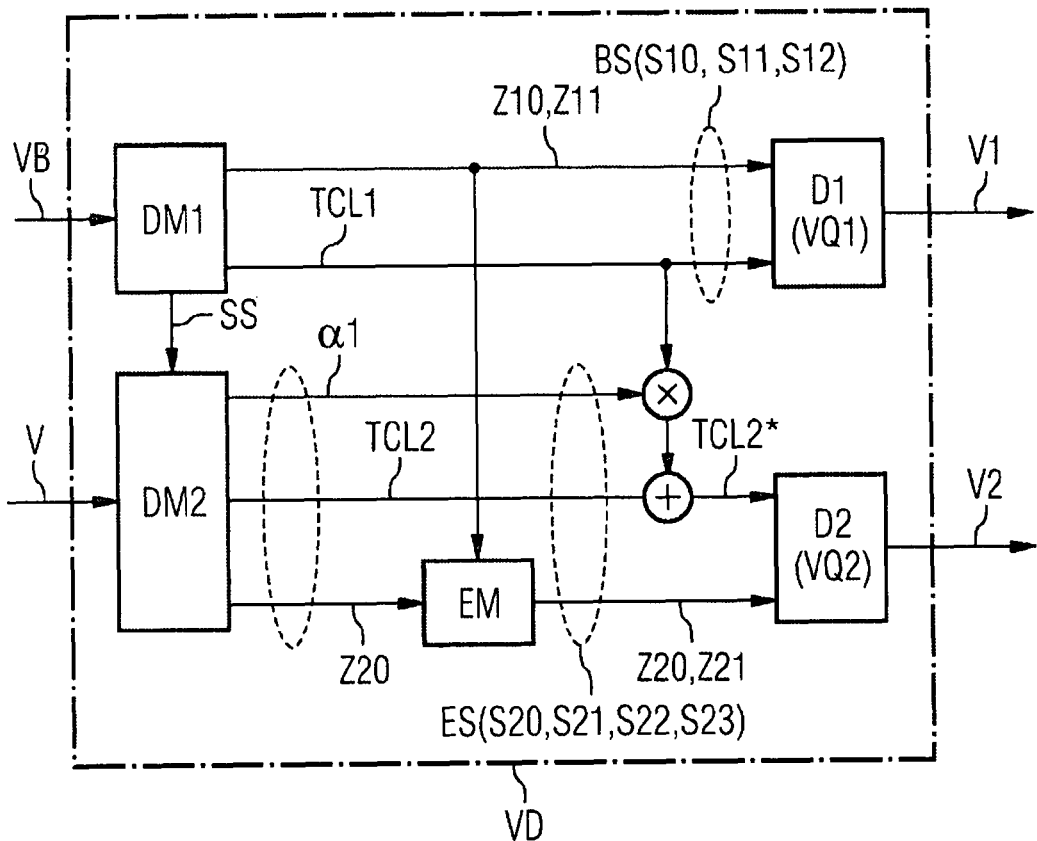

The reconstruction of the extension signal ES from the video data stream V is explained in greater detail below with reference to FIG. 5. The decoding device VD for reconstructing the extension signal ES includes in this case a first decoding unit DM1, which reconstructs from the base video data stream VB the first transform coefficient TCL1 and the first syntax elements S10, . . . , S12. In this case the base signal BS includes the first syntax elements S10, S11, S12. With the aid of the first decoder D1 a first video output signal V1 is created which can for example be displayed with the aid of a monitor. This first video output signal V1 represents in this case a first quality level VQ1 of the video input signal VI.

In addition the video data stream V is decoded with the aid of a second decoding unit DM2 in such a way that a plurality of second syntax elements S20, S22, S23 are available at the output of the second decoding unit DM2. In this case the assignment of the encoding parameters to the second syntax element is in accordance with the embodiments for FIG. 1. Now, with the aid of an extension unit EM, those second syntax elements S21 are recovered which were previously removed by the first unit ZM from the extension signal ES. Thus for example the motion vector Z11 =S11 is copied into the second syntax element S21. Thus the extension signal ES is reconstructed which includes the second syntax elements S20=Z20, S21=Z21, S22=TCL2, S23=L1. Before a second video output signal V2 can be created with the aid of a second decoder D2, the first transform coefficient TCL1 must still be logically combined with the second transform coefficient TCL2. This is undertaken using coefficients according to the following equation:

$$TCL2^* = \alpha 1 * TCL1 + TCL2 \qquad (2)$$

Thus the modified second transform coefficient TCL2* is created with the aid of the first transform coefficient TCL1 and the second transform coefficient TCL2. With the aid of the second syntax elements S20=Z20, S21=Z21 and the modified second transform coefficients TCL2, the second decoder D2 is able to generate the second video output signal V2, which represents a second quality level VQ2 of the video input signal VI. This can for example be output on a monitor.

Figure 6:
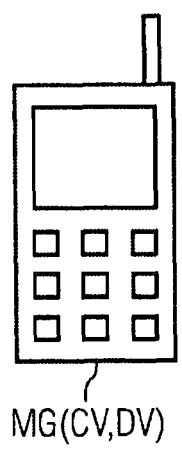

In an alternate embodiment in accordance with FIG. 6 the encoding device CV and/or the decoding device DV can be implemented in a mobile device MG, for example a mobile radio device according to the GSM standard. Alternatively the mobile device MG can have units for executing the proposed encoding method and/or decoding method. Thus the method can be used for example in a mobile device MG according to the GSM (GSM—Global System for Mobile) system. Furthermore the encoding device CV and/or the decoding device DV can be implemented in a processor unit, such as a computer for example.

Figure 7:
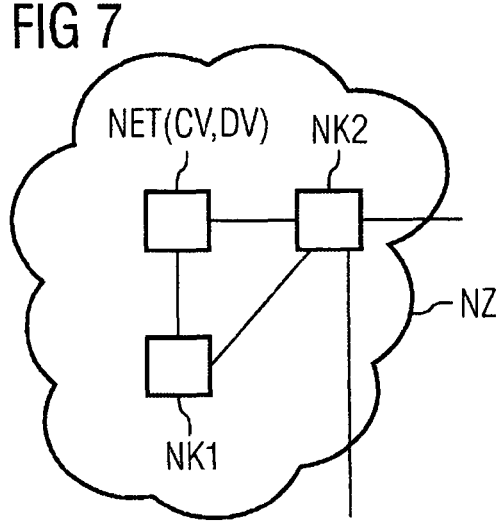

In a further alternate embodiment the network unit NET, the encoding device CV and/or the decoding device DV can be implemented in a network unit NET in accordance with FIG. 7, with a network NZ including network modules NK1, NK2 and the network unit NET. Alternately the network unit NET can have units for executing the proposed encoding method and/or decoding method. The network NZ can typically be embodied in accordance with the GSM standard and/or UMTS standard (UMTS—Universal Mobile Telecommunications System). Furthermore the method can typically be employed in a network unit according to an IMS standard (IMS—IP Multimedia Subsystem).

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69USPQ2d 1865 (Fed. Cir. 2004).

The invention of the claimed is:

1. An encoding method for a device to create a video data stream for an extension signal, with a first video quality level being represented by a base signal and a second video quality level being represented by the extension signal together with the base signal, comprising:
    executing, by the device, a process of:
        assigning information indicating a plurality of first data fields as first syntax elements to the base signal to describe the first video quality level;

assigning information indicating a plurality of second data fields as second syntax elements to the extension signal to describe the second video quality level;

modifying the extension signal to form a modified extension signal, by which values of each second syntax element of the modified extension signal differs from values of the first syntax elements so that the modified extension signal only includes syntax elements which cannot be reconstructed from the first syntax elements;

selecting an encoding mode for video encoding from a plurality of potential encoding modes, the encoding mode being selected to encode second syntax elements of the modified extension signal and to create the video data stream that is shorter than a video data stream that would have been created with any of other potential encoding modes; and creating the video data stream with the second syntax elements of the modified extension signal using the selected encoding mode.

2. The method as claimed in claim 1, wherein the second syntax elements of the extension signal include one or more syntax elements selected from a group comprising:

information about whether a transform coefficient of an image block is present, information about which image areas of the image block are assigned a transform coefficient, a quantizing parameter of the image block, a multiplier factor, and the transform coefficient.

3. The method as claimed in claim 2 wherein the potential encoding modes exclude an encoding mode that encodes a second syntax element by describing a motion vector of an image block.

4. The method as claimed in claim 3 wherein the potential encoding modes include H.261, H.263, H.264, MPEG1, MPEG2 and MPEG4.

5. The method as claimed in claim 1 wherein the potential encoding modes exclude an encoding mode that encodes a second syntax element by describing a motion vector of an image block.

6. The method as claimed in claim 1 wherein the potential encoding modes include H.261, H.263, H.264, MPEG1, MPEG2 and MPEG4.

7. The method as claimed in claim 1, wherein the base signal and the modified extension signal are each encoded with an encoding mode selected from a group of potential encoding modes comprising:

a first video encoding mode that excludes a data field for encoded motion vector syntax elements and includes a data field for encoded transform coefficient syntax elements, a second video encoding mode that excludes a data field for encoded motion vector syntax elements and excludes a data field for encoded transform coefficient syntax elements, and a third video encoding mode that includes a data field for encoded motion vector syntax elements and includes a data field for encoded transform coefficient syntax elements.

8. The method as claimed in claim 7, wherein the third video encoding mode is not selected for encoding the second syntax elements of the modified extension signal.

9. The method as claimed in claim 1, wherein the encoding mode is selected using a statistical method.

10. The encoding method as claimed in claim 1, wherein the modified extension signal is formed by eliminating any motion vector syntax element already included in the first syntax elements.

11. A decoding method for a device to reconstruct an original extension signal from a video data stream including a base signal and a modified extension signal, the base signal representing a first video quality level, the base signal together with the original extension signal representing a second video quality level, the video data stream being encoded using a selected video encoding method, the decoding method comprising:

executing, by the device, a process of:

using a decoding mode of the selected video encoding method to reconstruct the modified extension signal, the modified extension signal having information indicating a plurality of data fields as second syntax elements, values of each second syntax element differing from values of first data fields as first syntax elements of the base signal so that the modified extension signal only includes syntax elements which cannot be reconstructed from the first syntax elements; and obtaining the original extension signal by supplementing the second syntax elements of the modified extension signal with at least one first syntax element of the base signal.

12. The method as claimed in claim 11, wherein the selected video encoding method is H.261, H.263, H.264, MPEG1, MPEG2 or MPEG4 video encoding.

13. An encoding device for creating a video data stream for an extension signal, with a first video quality level being represented by a base signal and a second video quality level being represented by the extension signal together with the base signal, the base signal having information indicating a plurality of first data fields as first syntax elements assigned thereto to describe the first video quality level, the extension signal having information indicating a plurality of second data fields as second syntax elements assigned thereto to describe the second video quality level, comprising:

computer hardware, including at least one processor, configured to implement:

a modification unit to modify the extension signal to form a modified extension signal, by which values of each second syntax element of the modified extension signal differs from values of the first syntax elements so that the modified extension signal only includes syntax elements which cannot be reconstructed from the first syntax elements;

a selection unit to select an encoding mode for video encoding from a plurality of potential encoding modes, the encoding mode being selected to encode second syntax elements of the modified extension signal and to create the video data stream that is shorter than a video data stream that would have been created with any of other potential encoding modes; and an encoder to create the video data stream with the second syntax elements of the modified extension signal using the selected encoding mode.

14. The encoding device as claimed in claim 13, wherein the encoding mode is selected using a statistical method.

15. The encoding device as claimed in claim 13, wherein the modified extension signal is formed by eliminating any motion vector syntax element already included in the first syntax elements.

16. A decoding device to reconstruct an original extension signal from a video data stream including a base signal and a modified extension signal, the base signal representing a first video quality level, the base signal together with the original extension signal representing a second video quality level, the video data stream being encoded using a selected video encoding method, the decoding device comprising:

computer hardware, including at least one processor, configured to implement:

a decoding unit to use a decoding mode of the selected video encoding method to reconstruct the modified extension signal, the modified extension signal having information indicating a plurality of data fields as second syntax elements, values of each second syntax element differing from values of data fields as first syntax elements of the base signal so that the modified extension signal only includes syntax elements which cannot be reconstructed from the first syntax elements; and a supplementing unit to obtain the original extension signal by supplementing the second syntax elements of the modified extension signal with at least one first syntax element of the base signal.

\* \* \* \* \*